(12) United States Patent
Balling et al.

(10) Patent No.: US 9,964,031 B2
(45) Date of Patent: May 8, 2018

(54) HYDRAULIC VALVE AND PISTON ROD WITH HYDRAULIC VALVE

(71) Applicant: Hilile Germany GmbH, Marktneidenfeld (DE)

(72) Inventors: Manfred Balling, Würzburg (DE); Stefanie Hutzelmann, Graefendorf (DE); Dietmar Schulze, Gießen (DE); Tobias Matschiner, Marktheidenfeld (DE)

(73) Assignee: Hillte Germany GmbH, Marktheldenfeld (DE)

( * ) Notice: Subject to any disclaimer, the term of this patent is extended or adjusted under 35 U.S.C. 154(b) by 143 days.

(21) Appl. No.: 15/055,628

(22) Filed: Feb. 28, 2016

(65) Prior Publication Data
US 2017/0022895 A1 Jan. 26, 2017

(30) Foreign Application Priority Data

Mar. 26, 2015 (DE) .................. 10 2015 104 609
Jul. 10, 2015 (DE) .................. 10 2015 111 175

(51) Int. Cl.
| | | |
|---|---|---|
| F02B 75/04 | (2006.01) |
| F16C 7/06 | (2006.01) |
| F16K 27/04 | (2006.01) |
| F15B 15/14 | (2006.01) |
| F16C 23/10 | (2006.01) |

(52) U.S. Cl.
CPC ........ F02B 75/045 (2013.01); F15B 15/1457 (2013.01); F16C 7/06 (2013.01); F16K 27/041 (2013.01); *F16C 23/10* (2013.01); *F16C 2360/22* (2013.01)

(58) Field of Classification Search
CPC .......... F02B 75/045; F02B 75/04; F16C 7/06; F15B 15/1457; F16K 27/041
See application file for complete search history.

(56) References Cited

U.S. PATENT DOCUMENTS

| | | | |
|---|---|---|---|
| 2010/0218746 A1 | 9/2010 | Rabhi | |
| 2015/0059683 A1* | 3/2015 | Schulze | F02B 75/045 |
| | | | 123/197.3 |

FOREIGN PATENT DOCUMENTS

| | | |
|---|---|---|
| DE | 3148193 A1 | 6/1983 |
| DE | 10201001637 A1 | 9/2011 |
| DE | 102010016037 A1 | 9/2011 |
| DE | 102010019005 | 11/2011 |

(Continued)

*Primary Examiner* — Jacob Amick
(74) *Attorney, Agent, or Firm* — Von Rohrscheldt Patents

(57) ABSTRACT

A hydraulic valve, in particular for shifting an actuation piston in a piston rod for an internal combustion engine with variable compression, the piston rod including a valve housing which includes a first operating connection and a second operating connection and a supply connection which is loadable with a hydraulic pressure of a hydraulic fluid, wherein a piston that is movably arranged in the valve housing is movable in a linear manner against a force of a preloaded spring, wherein the operating connections and the supply connection are sealable relative to each other and against an ambient atmosphere by seal elements upon correct installation in a valve receiving bore hole of the connecting rod, and wherein the seal elements are applicable against a wall of the valve receiving bore hole in a sealing manner due to the hydraulic pressure.

17 Claims, 6 Drawing Sheets

(56) References Cited

FOREIGN PATENT DOCUMENTS

| | | | |
|---|---|---|---|
| DE | 102013107127 | A1 | 1/2015 |
| EP | 0438121 | A1 | 7/1991 |
| EP | 2386731 | A1 | 11/2011 |

* cited by examiner

HYDRAULIC VALVE AND PISTON ROD WITH HYDRAULIC VALVE

RELATED APPLICATIONS

This application claims priority from German patent applications number DE 10 2015 104 609.1 filed on Mar. 26, 2015 and DE 10 2015 111 175.6 filed on Jul. 10, 2015, both of which are incorporate in their entirely by this reference.

FIELD OF THE INVENTION

The invention relates to a hydraulic valve in particular for switching an actuation piston of an eccentrical element adjustment device in a piston rod for an internal combustion engine with variable compression for a motor vehicle. The invention also relates to a piston rod with a hydraulic valve of this type.

BACKGROUND OF THE INVENTION

In internal combustion engines a high compression ratio influences efficiency of the internal combustion engine in a positive manner. Compression ratio is typically defined as a ratio of an entire cylinder volume before compression to the remaining cylinder volume after the compression. Internal combustion engines with external ignition, in particular gasoline engines which have a fixed compression ratio only allow to select the compression ratio up to a certain number so that so called knocking under full load of the internal combustion engine is avoided. However, for the partial load range of the internal combustion engine, thus at a lower degree of filling of the cylinders the compression ratio can be selected with higher values without incurring "knocking". The important partial load range of an internal combustion engine can be improved when the compression ratio is variably adjustable. Systems with variable piston rod length are known for example for adjusting the compression ratio, wherein the systems actuate an eccentrical element adjustment device of a piston rod using hydraulic switch over valves.

A piston rod of this general type is known for example from DE 10 2013 107 127 A1. In the piston rod a hydraulic valve is provided which includes a hydraulic supply connection. The supply connection is provided with a hydraulic pressure. The hydraulic pressure moves a hydraulic piston of the hydraulic valve against a force of a preloaded spring. The hydraulic piston remains unchanged in a stable low pressure position in a low pressure range of the supply connection due to the preload of the spring.

In this stable low pressure position the supply connection is hydraulically connected with a first displacement cavity. Thus, the first displacement cavity empties in bursts towards the supply connection when a displacement cavity pressure due to gas or mass forces at the piston rod or at the eccentrical element is greater than a pressure at the supply connection.

The hydraulic piston includes a piston surface. When a pressure is applied to the piston surface which pressure comes from the supply connection and which is in a high pressure range the hydraulic piston contacts a stop. In this stable high pressure position the supply connection is connected with the second displacement cavity. Thus, the second displacement cavity empties in bursts towards the supply connection when a displacement cavity pressure due to gas or mass forces at the piston rod or at the eccentrical element is greater than a pressure at the supply connection.

Thus, during adjustment the displacement cavity is not filled by the relatively low pressure from the supply connection. Instead the displacement cavities are emptied by the relatively high forces at the piston rod against the relatively low pressure from the supply connection. An eccentrical element lever is actuated by a piston arranged in the displacement cavities, wherein the eccentrical element lever in turn adjusts an effective piston rod length through the eccentrical element and thus controls the variable compression of the internal combustion engine.

BRIEF SUMMARY OF THE INVENTION

It is an object of the invention to provide a hydraulic valve for controlling a hydraulic fluid wherein the hydraulic valve has a low amount of leakage.

Thus it is another object of the invention to provide a piston rod with a hydraulic valve which has a small amount of leakage.

According to one aspect of the invention the object is achieved by the features of the independent claims.

Advantageously embodiments and advantages of the invention can be derived from the dependent claims, the description and the drawing figures.

A hydraulic valve is proposed, in particular for switching an actuation piston in a piston rod of an internal combustion engine with variable compression wherein the hydraulic valve includes a valve housing which includes a first operating connection and a second operating connection and a supply connection which is loadable with a hydraulic pressure from a hydraulic fluid, wherein a piston that is moveably arranged in the valve housing is moveable in a linear manner against a force of a preloaded spring. Thus, the operating connections and the supply connection are scalable relative to each other and relative to an ambient atmosphere by seal elements when correctly installed m a valve receiving bore hole of the piston rod, wherein the seal elements are applicable in a sealing manner to a wall of the valve receiving bore hole by the hydraulic pressure.

The hydraulic valve according to the invention is useable particularly advantageously in a valve receiving bore hole of a piston rod wherein the valve receiving bore hole is deformable during operations due to high gas and mass forces at the piston rod, wherein the valve receiving bore hole can in particular expand in a radially outward direction so that the hydraulic valve and the seal element may not contact the wall of the valve receiving bore hole tightly anymore. Conventional seals like typically used O-rings fail in these applications and do not contact in a sealing manner any more. The seal element according to the invention is activated by the hydraulic pressure in a manner so that it is pressed radially outward by the hydraulic fluid so that it can lift from a seal seat in the valve element and can be pressed m a radial direction against the wall of the valve receiving bore hole in a sealing manner. The seal element can therefore be deformed by the hydraulic pressure or can move at least, thus so that it is applicable in a sealing manner by the hydraulic pressure in a seal seat of the valve element and/or against a wall of the valve bore hole.

This way the function of the hydraulic valve is not impaired. By the same token a possible leakage of the hydraulic fluid caused by a deformation of the valve receiving bore hole in a radially outward direction is prevented or at least reduced. Thus, correct operations for example of a variable piston rod operated by the hydraulic valve is assured.

According to an advantageous embodiment the valve housing can be provided for correct installation into the valve receiving bore hole with a radial clearance relative to the wall of the valve receiving bore hole of 100 µm at the most, advantageously 80 µm at the most, particularly advantageously 50 µm at the most. Through the radical clearance it can be assured that the hydraulic valve can move relative to the piston rod in the valve receiving bore hole in an axial direction and in a radial direction which is advantageous for a correct function of the hydraulic valve also in the valve receiving bore hole that is deform able due to the high gas and mass forces.

Due to the radial clearance the seal that is activated by the hydraulic pressure can move in its seal seat and can be applied to the wall of the valve receiving bore hole in a sealing manner. This is facilitated in that the hydraulic fluid can penetrate between the wall of the valve receiving bore hole and the valve housing due to the radial clearance.

According to an advantageously embodiment a projection of an outer diameter of the seal elements over an outer diameter of the valve housing in a non-installed condition of the valve housing can be provided in the amount of at least 50 µm, advantageously at least 100 µm, particularly advantageously at least 150 µm. When using a pressure activated seal element it is also advantageous when a particular projection of the outside diameter of the seal element over the outside diameter of the valve housing is provided so that the seal element when pressed in radially outward direction by the hydraulic pressure can also bridge the gap of the radial clearance which can even increase due to the deformation of the valve receiving bore hole so that the sealing function is provided. The seal element can be advantageously formed by a closed ring which has a rectangular cross section instead of a circular cross section like a torus shaped ring. Optionally at least a portion of the ring can have a rectangular cross section. Advantageously the flat surfaces of the rectangular cross section can form sealing surfaces.

According to an advantageous embodiment the seal elements can be arranged in circumferential ring grooves. Advantageously the seal elements are arranged in circumferential ring grooves in order to assure a position of the seal elements when mounting the hydraulic valve in the valve receiving bore hole of the piston rod and also during operation, in particular when the seal elements can still move when they are activated by the hydraulic pressure. For the function of the hydraulic valve it is essential that the seal elements remain at their provided position in order to assure a sealing between the two operating connections and the supply connection relative to each other and relative to ambient atmospheric pressure. This position also has to be maintained during the hydraulic pressure induced deformation of the valve receiving bore hole.

According to an advantageous embodiment the seal elements can be provided as seal rings which are applicable in a sealing manner by the hydraulic pressure provided at the respective operating connection against the wall of the valve receiving bore hole and a side surface of the ring grooves oriented away from the respective operating connection. This way it is assured that various portions of the gap between the valve housing and the wall of the valve receiving bore hole which are arranged in axial sequence can also be reliably sealed relative to each other. Thus, the two operating connections and the supply connection can be sealed relative to each other and relative to the ambient atmosphere reliably.

According to an advantageous embodiment the seal elements can be provided in two components, in particular in a radial direction. A pressure activated sealing of this type cannot be implemented with a conventional O-ring which is made from a purely elastic material so that the sealing function is also assured for greater deformations of the valve receiving bore hole. Therefore it is advantageous to use a stronger material or in an alternative embodiment to provide a two component seal element. For example an elastic O-ring made from rubber can be arranged as a preload element on a radial inside directly on a valve housing and there above a sliding ring for example made from Teflon can be arranged on a radial outside. Thus, the O-ring can press the Teflon ring in a radially outward direction due to its elasticity, whereas the Teflon ring is pressed further radially outward by the hydraulic pressure so that the Teflon ring contacts the wall of the valve receiving bore hole in a sealing manner. Advantageously the sliding ring can have a rectangular cross section.

According to an advantageous embodiment, the seal elements after being mounted in the ring grooves can be provided so that they are calibrateable to a nominal dimension. In order to assure that the required projection of the outer diameter of the seal element beyond the outer diameter of the valve housing and a required absolute outer diameter of the seal element is maintained it is advantageous to calibrate the seal element after being mounted in the ring grooves of the valve housing. This can be performed for example by pressing the hydraulic valve with mounted seal elements into a funnel.

According to an advantageous embodiment the seal elements can be made from a plastic material, in particular PTFE or PEEK. Seal elements which are not configured as completely elastic O-rings can be made for example for the plastic materials PTFE or PEEK. It is also conceivable that the plastic materials are reinforced with glass fibers or carbon fibers in order to achieve more strength under high incurring forces and in order to prevent a possible failure of the seal elements also under these forces.

According to an advantageous embodiment the seal elements can be provided as a metal seal. An alternative embodiment of a non elastic seal element is a metal seal which is plastically deformable in particular under high hydraulic pressures and which is applicable against a wall of the valve receiving bore hole in a sealing manner. When a diameter of the valve receiving bore hole shrinks in radially inward direction under decreasing or lacking gas and mass forces a metal seal can plastically deform backward so that the sealing function is even provided for a lower hydraulic pressure.

According to an advantageous embodiment the metal seal can be provided as a press sleeve into which the valve housing is shrunk. A reliable seating function can be assured when the metal seal is provided as a press sleeve which is shrunk onto the valve housing or into which the valve housing is shrunk. This provides a durable seal between the valve housing and the metal seal which leads to reliable sealing between the valve housing and the wall of the valve receiving bore hole also under high gas and mass forces.

According to another aspect the invention relates to a piston rod with a hydraulic valve arranged in a valve receiving bore hole and including hydraulic fluid, in particular for switching an actuation piston in the piston rod for a variable compression of an internal combustion engine. The piston rod includes a valve housing which includes a first operating connection and a second operating connection and a supply connection which is loadable with a hydraulic pressure of the hydraulic fluid. Thus, a piston that is moveably arranged in the valve housing is moveable against the force of a preloaded spring.

According to the invention the hydraulic valve is provided mechanically decoupled from the piston rod.

A mechanical decoupling between the hydraulic valve and the valve receiving bore hole of the piston is particularly advantageous in cases where very high hydraulic pressures occur which can be up to 380 bar for example for a piston rod for a variable compression. The high gas and mass forces generate deformation of the valve receiving bore hole which cannot be reliably bridged by conventional O-ring seals so that a permanent sealing function would not be provided. The mechanical decoupling of hydraulic valve and piston rod yields the option to use for example a pressure activated seal which is radially expanded in outward direction by the hydraulic pressure so that it can bridge the gap to be sealed. Thus, reliable operations of the hydraulic valve can be permanently provided in the piston rod.

According to an advantageous embodiment the hydraulic valve can be provided with a radial clearance of 100 μm at the most, advantageously 80 μm at the most, particularly advantageously 50 μm at the most, in the valve receiving bore hole of the piston rod. Through the radial clearance provided by the mechanical decoupling of hydraulic valve and piston rod it can be assured that the hydraulic valve can move relative to the piston rod in the valve receiving bore hole in an axial direction and in a radial direction which is advantageous for a correct function of the hydraulic valve also in the valve receiving bore hole that is deformable due to the high gas and mass forces. Due to the radial clearance a seal between the hydraulic valve and the wall of the valve receiving bore hole can move in its seal seat when activated by the hydraulic pressure and can contact the wall of the valve receiving bore hole in a sealing manner. This is facilitated in that the hydraulic fluid can penetrate between the wall of the valve receiving bore hole and the valve housing due to the radial clearance and can thus press the seal in a radially outward direction which reliably provides the seal function between the hydraulic valve and the piston rod.

According to an advantageous embodiment the operating connections can be provided sealed by seal elements against the supply connection and/or against an ambient atmosphere. Through the hydraulic valve pressurized oil can be run as a hydraulic fluid from a displacement chamber of the support piston through an operating connection to the supply connection of the hydraulic valve. From the supply connection the oil is run through a channel to the piston rod bearing. The switching function of the hydraulic valve can only be performed correctly when a leakage of the hydraulic fluid between both operating connections and the supply connection is kept as little as possible so that one or another operating connection can be switched through to the supply connection in a controlled manner. This in turn is only possible when the seal elements seal the operating connections and the supply connections relative to each other and relative to ambient atmosphere so that a spill over or leakage is kept small.

According to an advantageous embodiment the seal elements can be arranged in circumferential annular grooves. Circumferential annular grooves are advantageous since seal elements are typically configured as O-rings or annular elements which are retained in a predetermined position by the annular grooves, wherein the predetermined position can be reliably maintained during assembly in the valve receiving bore hole and also during operation under high hydraulic pressure.

According to an advantageous embodiment the seal elements can be provided as seal rings which are applicable in a sealing manner against a wall of the valve receiving bore hole and a side surface of the annular grooves which side surface is oriented away from the respective operating connection by the hydraulic pressure applied to the respective operating connection. Due to the high gas and mass forces the valve receiving bore holes expand considerably so that conventional O-rings would not contact in a sealing manner anymore. However, the seal element according to the invention is activated by the hydraulic pressure so that it is pressed radially outward by the hydraulic fluid and so that it can even lift off from a seal seat in the valve body and can be pressed in a radial direction against the wall of the valve receiving bore hole. Thus, the seal element can deform by the hydraulic pressure and can move at least, thus in a manner so that it can be applied by the hydraulic pressure against a seal seat of the valve element and against the wall of the valve bore hole.

According to an advantageous embodiment the seal elements can be provided in two components, in particular in a radial direction. A pressure activated seal of this type cannot be implemented by a conventional O-ring which is made from a purely elastic material so that the seal function is also assured for a larger deformation of the valve receiving bore hole. Therefore it is advantageous to use a stronger material or to use a two component seal element in an alternative embodiment. For example an elastic O-ring made from a rubber material can be arranged as a preload element radially inside directly on the valve housing above which a sliding ring for example made from Teflon is arranged on a radial outside. Thus, the O-ring can press the Teflon ring in radially outward direction due to its elasticity, whereas the hydraulic pressure presses the Teflon ring further in radially outward direction so that it is provided that the Teflon ring contacts the wall of the valve receiving bore hole in a sealing manner.

According to an advantageous embodiment the seal elements can be made from a plastic material, in particular PTFE or PEEK. Seal elements which are not configured as purely elastic O-rings can be formed for example from the plastic materials PTFE or PEEK. It is also conceivable that the plastic materials can be reinforced with glass fibers or carbon fibers in order to achieve more strength under high occurring forces and in order to prevent a possible failure of the seal elements also under these forces.

According to an advantageous embodiment the seal elements can be provided as a metal seal. An alternative embodiment of a non elastic seal element is a metal seal which is plastically deformable in particular under high hydraulic pressures and which can apply to the wall of the valve receiving bore hole in a sealing manner. When a diameter of the valve receiving bore hole shrinks radially inward with decreasing or lacking gas or mass forces a metal seal can deform back plastically so that the sealing function is still provided also under a low hydraulic pressure.

According to an advantageous embodiment the metal seal can be provided as a press sleeve into which the valve housing is shrunk. A reliable sealing function can be provided when the metal seal is provided as a press sleeve which is shrunk onto the valve housing or into which the valve housing is shrunk, wherein contact locations or seal locations piston rod to press sleeve and press sleeve to valve housing are provided axially adjacent to one another. Thus, a deformation caused on an outside of the press sleeve by piston rod loading can be kept away from the valve housing so that a permanent seal between valve housing and metal seal is provided which leads to reliable sealing between the valve housing and a wait of the valve receiving bore hole also under high gas and mass forces.

BRIEF DESCRIPTION OF THE DRAWINGS

Additional advantages can be derived from the subsequent drawing description. The drawings illustrate embodiments of the invention. The drawings, the description and the claims include several features in combination. A person skilled in the art will advantageously view the features individually and will combine them to form useful additional combinations, wherein:

DETAILED DESCRIPTION OF THE INVENTION

Figure 1:
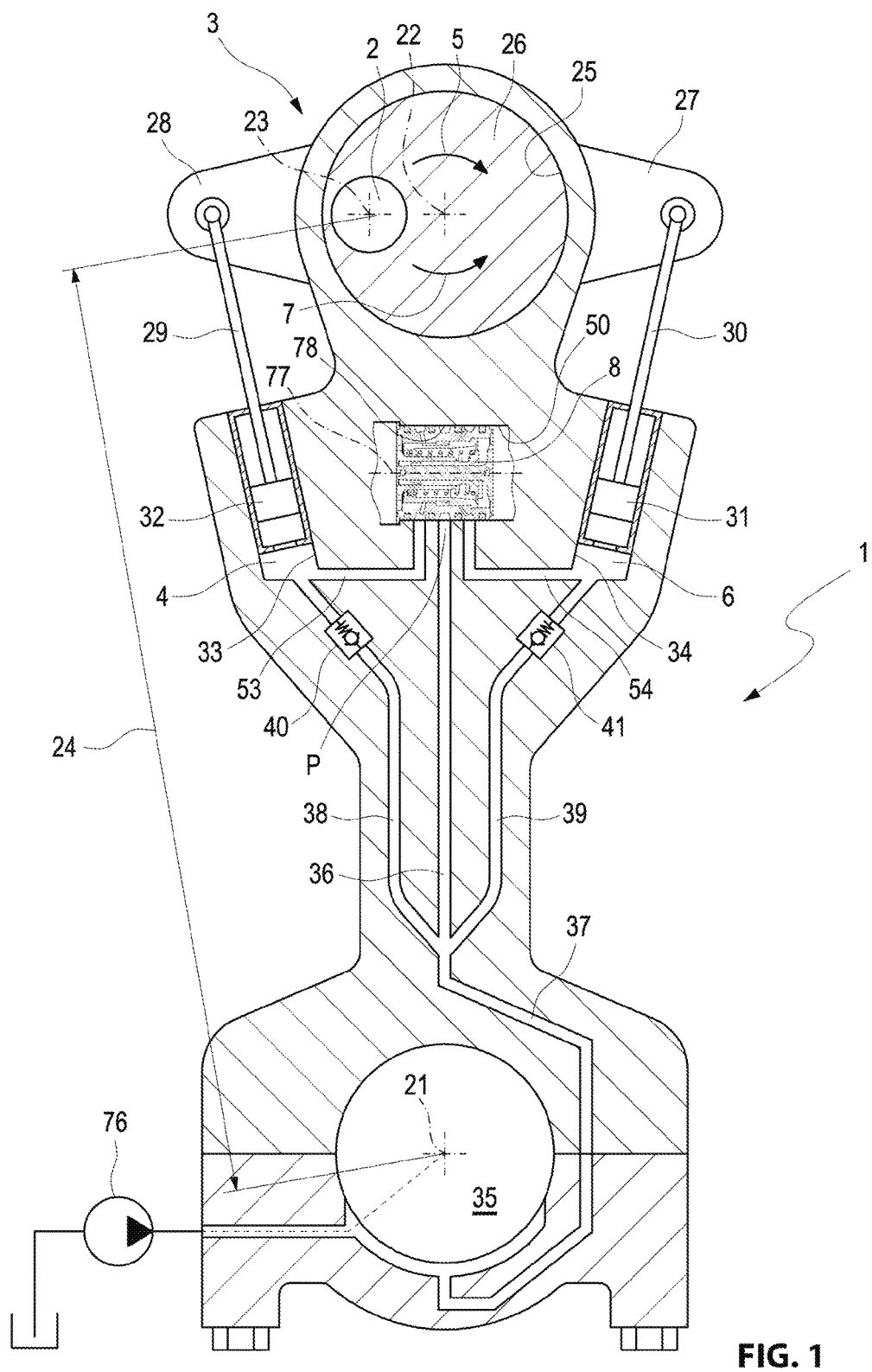
FIG. 1 illustrates a schematic representation of a known connecting rod for a variable compression of an internal combustion engine of a motor vehicle.

Identical or equivalent components are designated with identical reference numerals in the drawing figures. The figures illustrate exemplary embodiments and do not limit the spirit and scope of the invention.

FIG. 1 illustrates a known piston rod 1 for a variable compression of an internal combustion engine of a motor vehicle. The piston rod 1 includes an upper wrist pin bearing eye 2 in which a non illustrated wrist pin is inserted. The wrist pin is typically firmly inserted into a combustion chamber piston of the internal combustion engine. The wrist pin bearing eye 2 is pivotable about a pivot axis 22 using an eccentrical element adjustment device 3 wherein the pivot axis 22 is offset in parallel relative to the longitudinal axis 23 of the wrist pin bearing eye 2. Thus, it is possible to vary the wrist pin bearing eye 2 with respect to its distance 24 as an effective piston rod length relative to a piston rod bearing axis 21 of a piston rod bearing 35. Thus, a variable compression of the combustion chamber can be implemented.

The eccentrical element adjustment device 3 includes an eccentrical element 26 that is pivotably arranged in a bore hole 25 of the piston rod 1. The eccentrical element 26 is connected with an eccentrical element lever from which two arms 27, 28 extend diametrically opposite to one another. Support rods (eccentrical element rods) 29, 30 extend at ends of the two arms 27, 28. The support rods 29, 30 are pivotably connected with two small actuation pistons 31, 32. Thus, it is possible to pivot the eccentrical element 28 within the bore hole 25 of the connecting rod 1. Thus, one small actuating piston 31 or 32 moves out of a cylindrical bore hole 34, or 33 within the piston rod 1, whereas the other actuation piston 32 or 31 moves into a cylindrical bore hole 33 or 34 of the connecting rod 1. When the left linear piston 32 in the drawing moves inward, the eccentrical element 26 is pivoted in the rotation direction 7 counter clockwise. When the right linear piston 31 moves inward, the eccentrical element 26 is pivoted clock wise in rotation direction 5. The clock wise rotation causes a displacement of the wrist pin bearing eye 2 further upward or further away from the piston rod bearing axis 21. Thus, the distance 24 forming the effective piston rod length is increased and thus the compression in the combustion chamber is increased. For a maximally inserted right linear piston 31 the combustion chamber is set to maximum compression. Analogously pivoting the eccentrical element 28 counter clockwise this means in rotation direction 7 causes a reduction of compression up to a stage of minimum compression.

In order to control the two compression stages a hydraulic valve 8 with a valve longitudinal axis 77 is arranged in a valve receiving bore hose 50. This hydraulic valve 8 facilitates running pressurized oil as a hydraulic fluid from a displacement cavity 4 or 6 to a supply connection P of the hydraulic valve 8. From the supply connection P the oil is run through a channel 36, 37 to the piston rod bearing 35 where it is introduced into an oil supply of a crank pin of the crank shaft. This crank pin is rotatably arranged within the piston rod bearing 35 as usual. In a four cylinder engine for example four crank pins are arranged at the crank shaft. Accordingly the 4 cylinder engine includes four piston rods 1 with a total of 4 piston rod bearings 35.

The oil supply within the piston rod bearing 35 comes from an oil pump 76 of the internal combustion engine and supplies the too displacement cavities 4, 6 through supply conduits 38, 39. Thus, the two supply conduits 38, 39 respectively include an inserted check valve 40, 41 which closes in flow direction from the respective displacement cavity 4 or 6 towards the oil supply and opens in the opposite flow direction.

Forces transferred from the combustion chamber piston through the wrist pin bearing eye 2 onto the support rods 29, 30 are very high. These high forces are much greater than the forces which impact the linear piston 31 or 32 due to the pressure of the oil pump 76. Thus, the hydraulic valve 8 can return pressure as a function of its position from the first displacement cavity 6 or the second displacement cavity 4 or 6 back to the oil supply. When a displacement cavity 4 or 6 is reduced in size due to the high forces of the combustion chamber piston the other displacement cavity 4 or 6 sucks in oil from the oil supply through an opening check valve 40 or 41.

On a path from the oil pump 76 to the oil supply within the crank shaft additional consumers are connected which branch off oil. In particular lubricated bearings reduce the oil pressure. Viscosity of the oil influences oil pressure.

Figure 2:
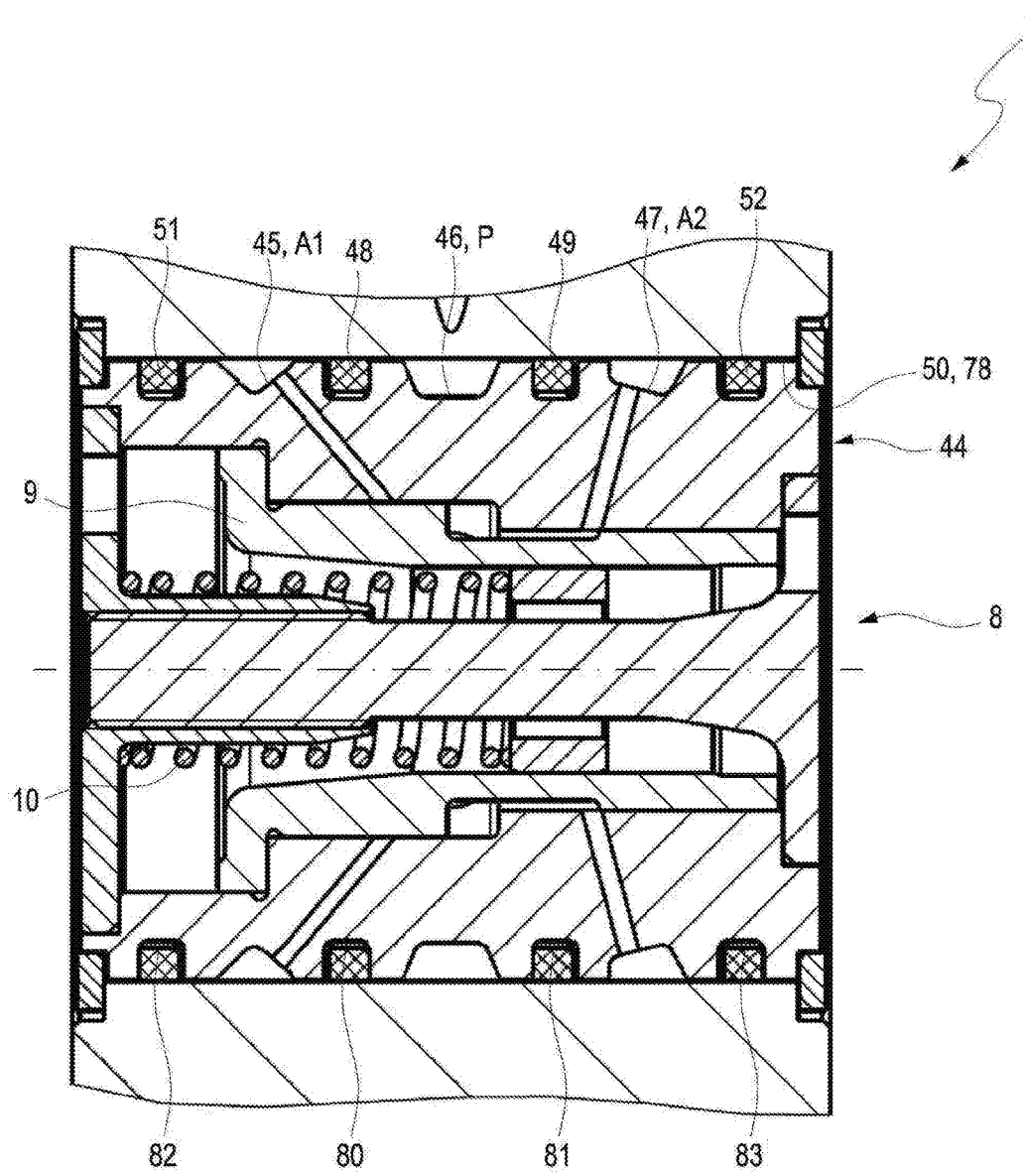
FIG. 2 illustrates a hydraulic valve installed into the valve receiving bore hole of the piston rod according to one embodiment of the invention in a longitudinal sectional view.
Figure 3A:
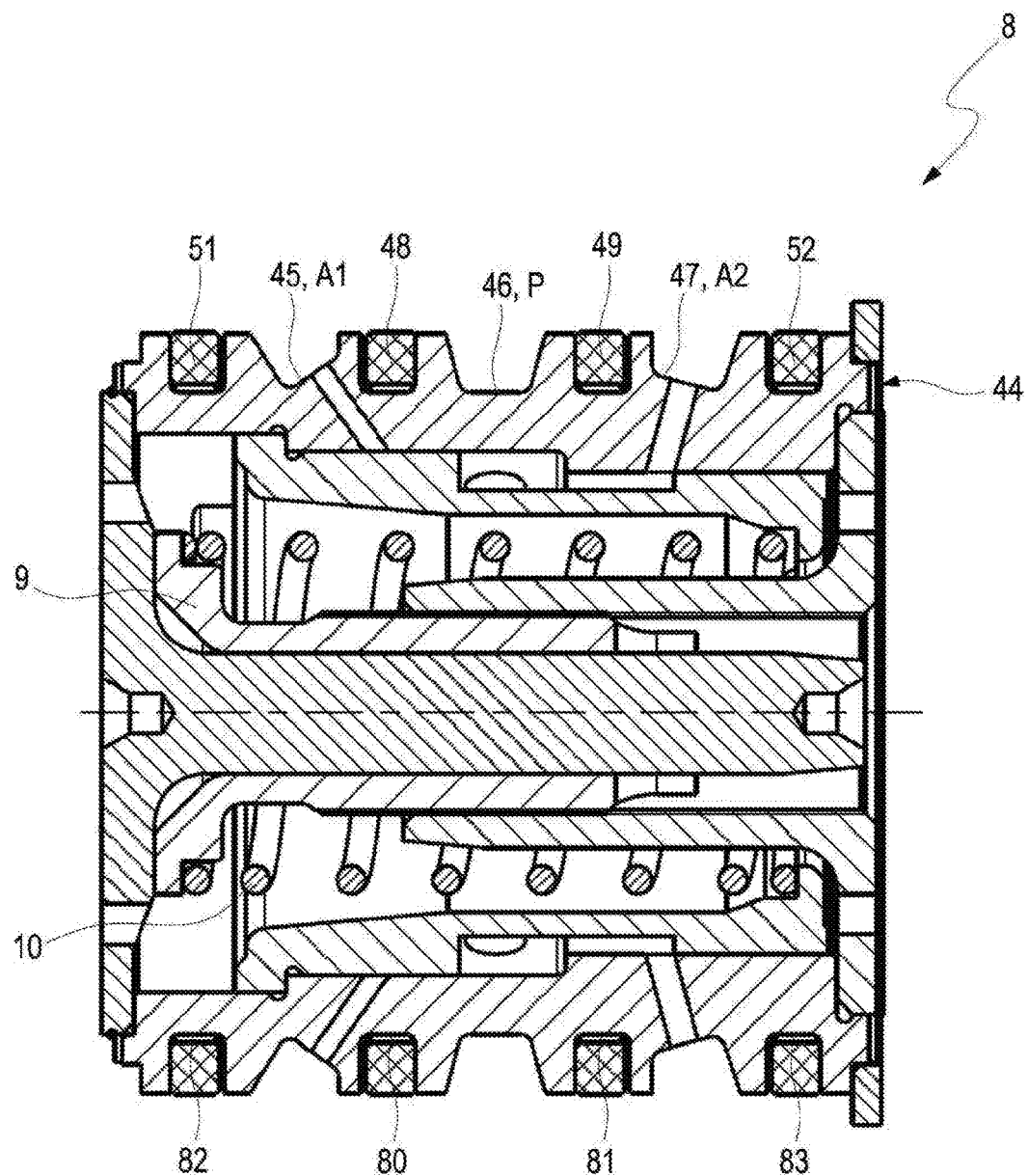
FIG. 3a illustrates the hydraulic valve of FIG. 2 in a blown up detail.
Figure 3B:
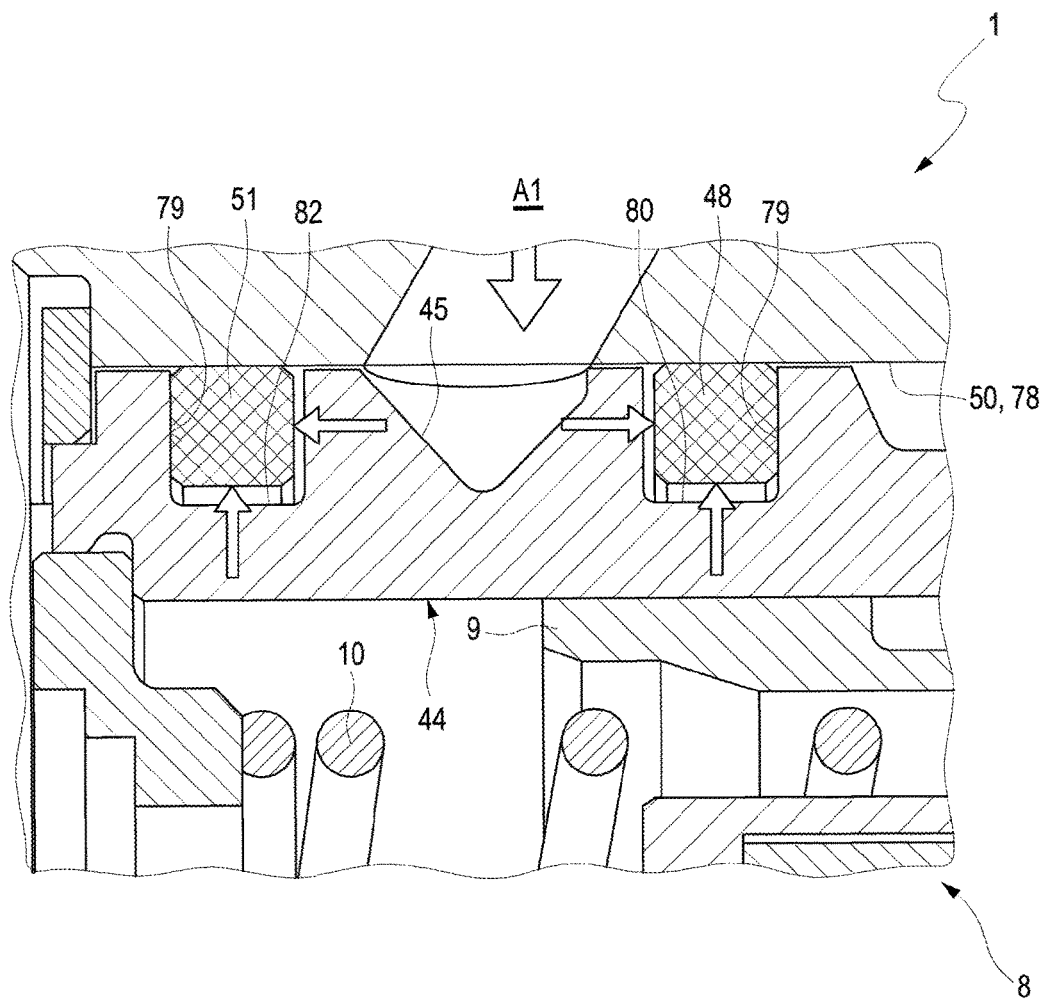
FIG. 3b illustrates a partial view of the hydraulic valve of FIG. 2 focusing on two seal elements.

FIG. 2 illustrates a hydraulic valve 8 installed into the valve receiving bore hole 50 of the connecting rod 1 according to one embodiment of the invention in a longitudinal sectional view, whereas FIG. 3a illustrates the hydraulic valve 8 in an enlarged view and FIG. 3b illustrates a detail view of the hydraulic valve 8 with focus on two seal elements 48, 51.

The hydraulic valve 8 illustrated in FIGS. 2 and 3a, 3b which is provided in particular for shifting the actuation piston 31, 32 in the piston rod 1 for a variable compression of an internal combustion engine includes a bushing shaped valve housing 44 which includes three axially offset annular grooves 45, 46, 47 on an outside. The supply connection P is associated with the center annular groove 46, wherein the supply connection P is loadable with a hydraulic pressure of the hydraulic fluid.

Thus, a piston 9 that is moveably arranged in the valve housing 44 and configured as a step piston is movable against a force of the preloaded spring 10. The two outer annular grooves 45 and 47 represent operating connections A1 and A2.

The annular grooves 45, 48, 47 are hydraulically separated from each other by seal elements 48, 49 which are provided herein as seal rings in circumferential annular grooves 80, 81. The hydraulic valve 8 is inserted into the valve receiving bore hole 50 in the piston rod 1. In order to prevent a pressure loss or leakages of the two outer ring grooves 45, 47 additional seal rings 51, 52 are provided in circumferential ring grooves 82, 83. The two outer ring grooves 45, 47 lead to the associated displacement chamber 4 or 6 respectively through a channel 53, 54.

A seal gap between the housing 44 and the piston 9 is provided as small as possible. Forces acting upon the piston rod 1 lead to a deformation of the valve receiving bore hole 50. This deformation, however, must not impair the function of the hydraulic valve 8. In order to prevent any impairment the hydraulic valve 8 is provided mechanically decoupled from the piston rod 1.

Thus, the hydraulic valve 8 is installed into the valve receiving bore hole 50 with a radial clearance, so that a movement relative to the piston rod 1 is assured. For installation according to the invention into the valve receiving bore hole 50 the valve housing 44 is provided with a radial clearance relative to the wall 78 of the valve receiving bore hole 50 in the amount of 100 µm at the most, advantageously 80 µm at the most, particularly advantageously 50 µm at the most. Through the radial clearance it can be provided that the hydraulic valve 8 can move relative to the piston rod 1 in the valve receiving bore hole 50 in an axial direction and in a radial direction which is advantageous for a correct function of the hydraulic valve 8 also in the valve receiving bore hole 50 that is deformable due to the high gas and mass forces. Through the radial clearance the seal 48, 49, 51, 52 that is activated by the hydraulic pressure can move in its seal seat and is applied in a sealing manner against the wall 78 of the valve receiving bore hole 50. This is facilitated in that the hydraulic fluid can penetrate between the wall 78 of the valve receiving bore hole 50 and the valve housing 44 due to the radial clearance.

The seal elements 48, 49, 50, 51 perform the function to seal the ring grooves 45, 47 of the operating connections A1, A2 relative the supply connection P or the ambient atmosphere. The seal elements 48, 49, 51, 52 are applied to the wall 78 of the valve receiving bore hole 50 in a sealing manner by the hydraulic pressure. The relatively high pressure in the ring grooves 45, 47 moves the seals radially outward as illustrated in FIGS. 3a, 3b so that they contact the wall 78 of the valve receiving bore hole.

In order to provide safe application of the seal elements 48, 49, 51, 52 to the wall 78 of the valve receiving bore hole 50 a projection of an outer diameter of the seal elements 48, 49, 51, 52 beyond an outer diameter of the hydraulic valve of at least 50 µm, advantageously 100 µm, particularly advantageously at least 150 µm is provided. The seal elements 48, 49, 51, 52 are arranged in the circumferential annular grooves 80, 81, 82, 83. The seal elements 48, 49, 51, 52 are provided calibrateable to a nominal dimension after being mounted in the ring grooves 80, 81, 82, 83. In order to provide that the required projection of the outer diameter of the seal element 48, 49, 51, 52 beyond the outer diameter of the valve housing 44 and a required absolute diameter of the seal element 48, 49, 51, 52 is maintained it is advantageous that the seal element 48, 49, 51, 52 is calibrated on the valve housing 44 after being mounted in the ring grooves 80, 81, 82, 83. This can be performed for example by impressing the hydraulic valve 8 with mounted seal elements 48, 49, 51, 52 into a funnel.

Advantageously the seal elements 48, 49, 51, 52 are arranged in circumferential annular grooves 80, 81, 82, 83 in order to secure a position of the seal elements 48, 49, 51, 52 during assembly of the hydraulic valve 8 of the piston rod 1 and also during operations, in particular when the seal elements 48, 49, 51, 52 that are activated by the hydraulic pressure can still move. It is essential for the function of the hydraulic valve 8 that the seal elements 48, 49, 51, 52 remain at their provided position in order to provide a sealing between both operating connections A1, A2 and the supply connection P relative to each other and relative to the ambient atmosphere. This position must also be maintained during a deformation of the valve receiving bore holes 50 that is caused by the hydraulic pressure.

The seal elements 48, 49, 51, 52 are advantageously made from a plastic material, in particular PTFE or PEEK. It is also conceivable that the plastic materials can be reinforced with glass fibers or carbon fibers in order to achieve even more strength under high occurring forces and in order to prevent s possible failure of the seal elements 48, 49, 51, 52 also under these forces.

It is evident in particular from FIG. 3b that the seal elements 48, 49, 51, 52 are applied in a sealing manner by the pressure provided at the respective operating connection 81, 82 represented by the arrows against the wall 78 of the valve receiving bore hole 50 and a side surface 79, of the ring grooves 80, 81, 82, 83 oriented away from the respective operating connection A1, A2. This way it is assured that various portions of the gap between the valve housing 44 and the wall 78 of the valve receiving bore hole 50 which are arranged axially adjacent to each other can also be sealed reliably relative to each other. Thus, the two operating connections A1, A2 and the supply connection P can be reliably sealed relative to each other and against the ambient atmosphere.

Figure 4:
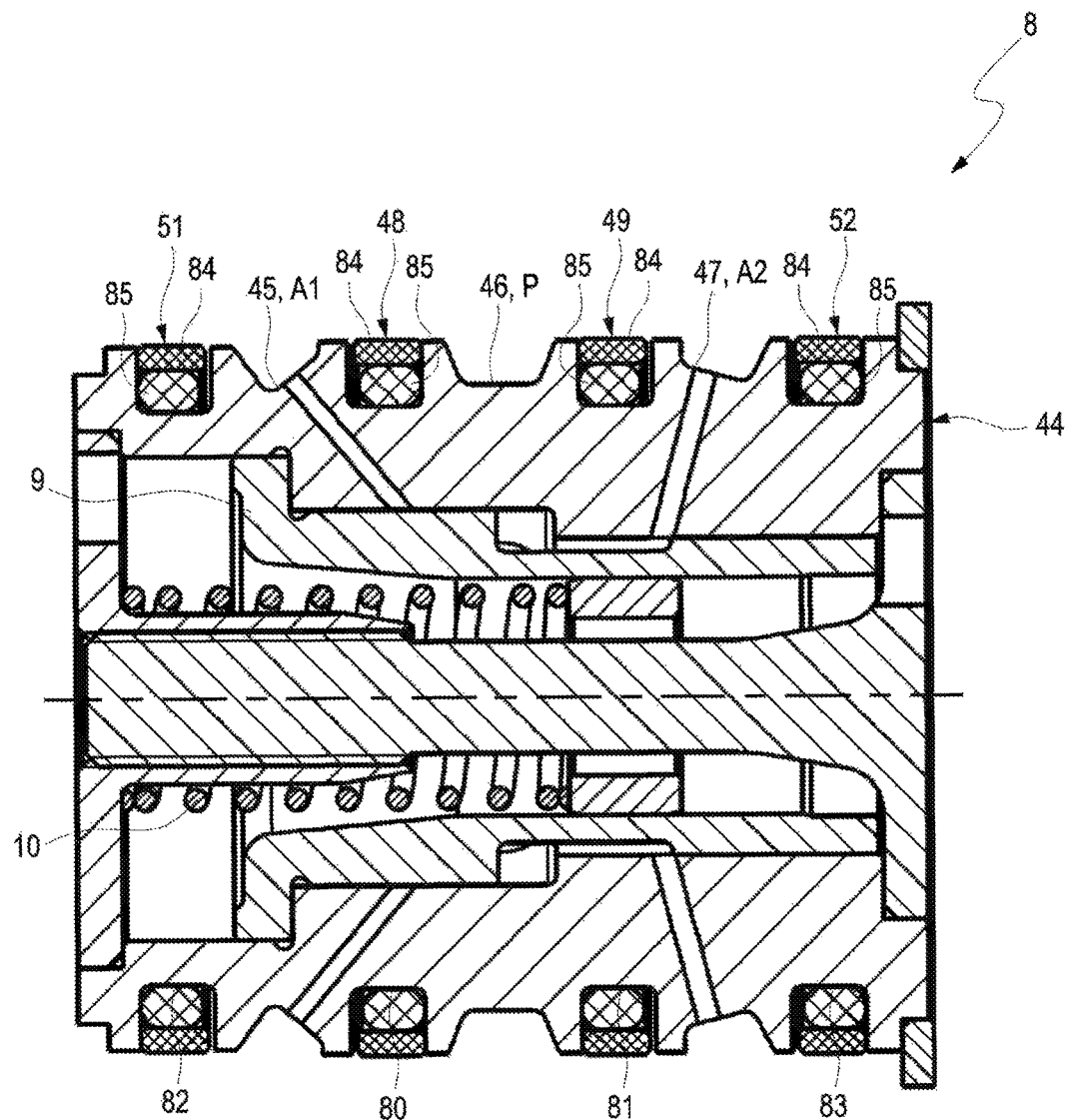
FIG. 4 illustrates a hydraulic valve with two components seal elements according to an additional embodiment according to the invention in a longitudinal sectional view.
Figure 5:
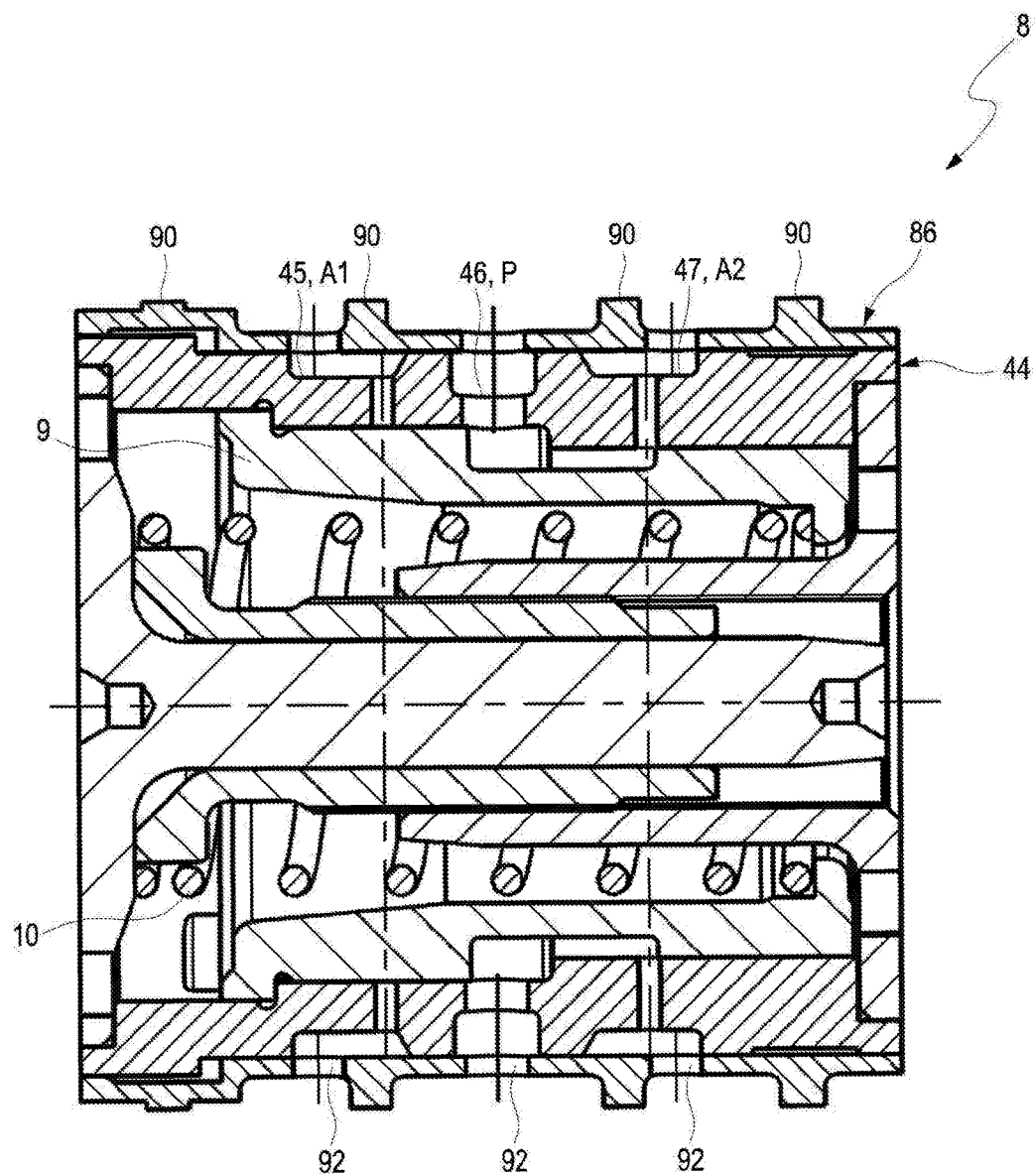
FIG. 5 illustrates a hydraulic valve with a metal seal according to another embodiment of the invention in a longitudinal sectional view.

FIGS. 4 and 5 illustrate additional embodiments which differ only with respect to the configuration of the seal elements 48, 49, 51, 52 of the hydraulic valve 8.

FIG. 4 illustrates two component seal elements 48, 49, 51, 52. The seal elements respectively include a plastic seal ring 84 and a rubber seal ring 85 as preload elements. For example a plastic O-ring 85 made from rubber can be arranged as a preload element on a radial inside directly on the valve housing 44 wherein a sliding ring 84, for example made from Teflon is arranged on a radial outside of the valve housing 44. The O-ring 85 is configured as a typical O-ring with a circular cross section whereas the Teflon ring 84 is configured with a rectangular cross section. Thus, the O-ring 85 can press the Teflon ring 84 radially outward due to its elasticity, whereas the Teflon ring 84 is pressed further radially outward by the hydraulic pressure so that care is taken that the Teflon ring 84 contacts the wall of the valve receiving bore hole 78 in a sealing manner with its flat surface since the Teflon ring 84 is not elastically deformable.

The other embodiment illustrated in FIG. 5, however, includes a metal seal 86. The metal seal 38 is provided for example as press sleeve to which the valve housing 44 is shrunk.

A metal seal 86 is another embodiment for the non elastic seal elements 48, 49, 51, 52 which is plastically deformable in particular under high hydraulic pressures and which can thus be applied to the wall 78 of the valve receiving bore hole 50 in a sealing manner. When the diameter of the valve receiving bore hole 50 shrinks radially inward again when the gas or mass forces are reduced or removed completely, then a metal gasket 88 can also be deformed back again so that the seal function is still provided for a low hydraulic pressure.

A reliable sealing function can be provided when the metal seal element 86 is provided as a press sleeve which is shrunk onto the valve housing 44 or into which the valve housing 44 is shrunk. This provides a permanent seal between the valve housing 44 and the metal seal 85 with a high level of reliability which leads to a reliable sealing effect between the valve housing 44 and the wall 78 of the valve receiving bore hole 50.

The metal seal 86 includes seal ribs 90 at its outer circumference which can contact the wall 78 of the valve receiving bore hole 50 in a sealing manner and can thus provide a reliable seal effect between the two operating connections A1 and A2 and the supply connection P and the ambient atmosphere.

Contact locations or seal locations of piston rod 1 to press sleeve and press sleeve to valve housing 44 are provided axially adjacent to each other wherein a deformation caused on an outside of the press sleeve by piston rod loading can be kept away from the valve housing 44 in the metal seal 86 provided as a press sleeve additional pass through openings 92 are provided in order to supply the two operating connections A1 and A2 and the supply connection P with the hydraulic fluid from an outside. Thus, a functional sealing effect of the metal seal 86 is provided like with individual seal rings.

What is claimed is:

1. A hydraulic valve for shifting an actuation piston in a piston rod for an internal combustion engine with variable compression, the piston rod comprising:
    a valve housing which includes a first operating connection, a second operating connection and a supply connection which is loadable with a hydraulic pressure of a hydraulic fluid,
    wherein a piston that is arranged in the valve housing is movable in a linear manner against a force of a preloaded spring,
    wherein the first operating connection, the second operating connection and the supply connection are sealable relative to each other and against an ambient atmosphere by seal elements installed in a valve receiving bore hole of the connecting rod,
    wherein the seal elements are applicable against a wall of the valve receiving bore hole by the hydraulic pressure in a sealing manner, and
    wherein the valve housing is provided for installation in the valve receiving bore hole with a radial clearance of 100 µm at the most relative to a wall of the valve receiving bore hole.

2. The hydraulic valve according to claim 1, wherein a projection of an outer diameter of the seal elements beyond an outer diameter of the valve housing is provided in non-installed condition of the hydraulic valve in the amount of at least 150 µm.

3. The hydraulic valve according to claim 1, wherein the seal elements are arranged in circumferential ring grooves.

4. The hydraulic valve according to claim 3,
    wherein the seal elements are provided as seal rings which are applicable in a sealing manner by the hydraulic pressure applied to a respective operating connection, and
    wherein the seal rings are applicable against a wall of the valve receiving bore hole and a side surface of ring grooves oriented away from the respective operating connection.

5. The hydraulic valve according to claim 3, wherein the seal elements are configured in two components in a radial direction.

6. The hydraulic valve according to claim 3, wherein the seal elements are provided calibrateable to a nominal dimension after being mounted in the ring grooves.

7. The hydraulic valve according to claim 1, wherein the seal elements are made from a plastic material.

8. The hydraulic valve according to claim 1, wherein the seal elements are configured as a metal seal.

9. The hydraulic valve according to claim 8,
    wherein the metal seal is provided as a press sleeve into which the valve housing is shrunk, and
    wherein contact locations or seal locations of the piston rod against the press sleeve and of the press sleeve against the valve housing are provided axially adjacent to one another.

10. A piston rod with a hydraulic valve arranged in a valve receiving bore hole and with a hydraulic fluid for shifting an actuation piston in the piston rod for a variable compression internal combustion engine, the piston rod comprising:
    a valve housing which includes a first operating connection, a second operating connection and a supply connection which is loadable with a hydraulic pressure of the hydraulic fluid,
    wherein a piston that is arranged in the valve housing is movable in a linear manner against a force of a preloaded spring,
    wherein the hydraulic valve is provided mechanically decoupled from the piston rod,
    wherein the seal elements are arranged in circumferential ring grooves,
    wherein the seal elements are provided as seal rings which are applicable in a sealing manner by the hydraulic pressure applied to a respective operating connection, and
    wherein the seal rings are applicable against the wall of the valve receiving bore hole and a side surface of the ring grooves oriented away from the respective operating connection.

11. The piston rod according to claim 10, wherein the hydraulic valve is installed into the valve receiving bore hole with a radial clearance of 100 µm at the most.

12. The piston rod according to claim 10, wherein the first operating connection and the second operating connection are sealed by seal elements relative to the supply connection or relative to an ambient atmosphere.

13. The piston rod according to claim 12, wherein the seal elements are configured in two components-in the radial direction.

14. The piston rod according to claim 10, wherein the seal elements are made from PTFE or PEEK.

15. The piston rod according to claim 12, wherein the seal elements are configured as a metal seal.

16. The piston rod according to claim 15,
    wherein the metal seal is provided as a press sleeve into which the valve housing is shrunk, and wherein contact locations or seal locations of the piston rod against the press sleeve and of the press sleeve against the valve housing are provided axially adjacent to one another.

17. The hydraulic valve according to claim 5, wherein the plastic material is PTFE or PEEK.

\* \* \* \* \*

UNITED STATES PATENT AND TRADEMARK OFFICE
CERTIFICATE OF CORRECTION

PATENT NO. : 9,964,031 B2
APPLICATION NO. : 15/055628
DATED : May 8, 2018
INVENTOR(S) : Manfred Balling et al.

Page 1 of 1

It is certified that error appears in the above-identified patent and that said Letters Patent is hereby corrected as shown below:

On the Title Page

Change the name of item (71) applicant and item (73) assignee to "HILITE GERMANY GMBH".

Signed and Sealed this
Eighteenth Day of June, 2019

Andrei Iancu
*Director of the United States Patent and Trademark Office*